(12) United States Patent
Jessie, Jr.

(10) Patent No.: US 11,628,902 B2
(45) Date of Patent: Apr. 18, 2023

(54) TOOL-LESS STEERING WHEEL ASSEMBLY

(71) Applicant: Huffy Corporation, Miamisburg, OH (US)

(72) Inventor: Donald K. Jessie, Jr., Middletown, OH (US)

(73) Assignee: Huffy Corporation, Miamisburg, OH (US)

( * ) Notice: Subject to any disclaimer, the term of this patent is extended or adjusted under 35 U.S.C. 154(b) by 688 days.

(21) Appl. No.: 16/528,787

(22) Filed: Aug. 1, 2019

(65) Prior Publication Data
US 2020/0039600 A1 Feb. 6, 2020

Related U.S. Application Data

(60) Provisional application No. 62/713,253, filed on Aug. 1, 2018.

(51) Int. Cl.
| | | |
|---|---|---|
| B62D 1/10 | (2006.01) | |
| B62D 1/04 | (2006.01) | |
| B62K 21/24 | (2006.01) | |
| B62K 21/12 | (2006.01) | |
| B62K 9/00 | (2006.01) | |
| B62D 65/14 | (2006.01) | |
| B62K 5/01 | (2013.01) | |

(52) U.S. Cl.
CPC ................ *B62K 21/12* (2013.01); *B62D 1/10* (2013.01); *B62D 65/14* (2013.01); *B62K 5/01* (2013.01); *B62K 9/00* (2013.01); *B62K 21/24* (2013.01); *B62K 2202/00* (2013.01)

(58) Field of Classification Search
CPC ............. B62D 1/04; B62D 1/10; B62K 21/24
See application file for complete search history.

(56) References Cited

U.S. PATENT DOCUMENTS

| | | | | |
|---|---|---|---|---|
| 4,840,078 A | * | 6/1989 | Shitanoki ................ | B62D 1/10 74/552 |
| 4,901,544 A | * | 2/1990 | Jang ..................... | B60R 25/0222 70/252 |
| 5,180,029 A | * | 1/1993 | Rosenlund .......... | B60R 25/0222 70/252 |
| 5,921,147 A | * | 7/1999 | Nagata ..................... | B62D 1/10 74/552 |
| 6,314,833 B1 | * | 11/2001 | Pillsbury, IV ........... | B62D 1/10 74/552 |
| 6,318,756 B1 | * | 11/2001 | Papandreou ............. | B62D 1/10 74/552 |
| 6,708,998 B1 | * | 3/2004 | Blake ...................... | B62M 3/00 403/324 |

(Continued)

*Primary Examiner* — Barry Gooden, Jr.
(74) *Attorney, Agent, or Firm* — Wood Herron & Evans LLP

(57) ABSTRACT

A steering wheel assembly for use with a ride-on vehicle which has a frame with at least two wheels. The steering wheel assembly comprises a steering rod operatively coupled to the frame of the ride-on vehicle. The steering rod includes a chuck secured to the steering rod. The chuck includes a body extending between a base and an upper end. The steering wheel assembly further comprises a steering wheel with a sleeve adapted to be coupled to the chuck in a tool-less manner such that the steering wheel is configured to be engaged by a rider for moving the steering wheel and thereby steering the ride-on vehicle.

11 Claims, 7 Drawing Sheets

(56) References Cited

U.S. PATENT DOCUMENTS

| | | | | |
|---|---|---|---|---|
| 7,527,293 B1* | 5/2009 | Wang | ............ | B62D 1/10 |
| | | | | 280/771 |
| 8,262,114 B2* | 9/2012 | Jessie, Jr. | ............ | B62K 9/02 |
| | | | | 74/551.8 |
| 8,313,118 B2* | 11/2012 | Aiken | ............ | B62K 9/02 |
| | | | | 280/47.11 |
| 8,366,135 B2* | 2/2013 | Asbach | ............ | B62K 9/00 |
| | | | | 280/446.1 |
| 8,517,406 B2* | 8/2013 | Diekman | ............ | B62K 9/02 |
| | | | | 280/282 |
| 9,254,884 B2* | 2/2016 | Jessie, Jr. | ............ | B62K 13/04 |
| 9,821,765 B1* | 11/2017 | Miller | ............ | B62D 1/10 |
| 10,308,215 B2* | 6/2019 | Ting | ............ | B62D 1/10 |
| 2005/0097982 A1* | 5/2005 | Li | ............ | B60R 25/0222 |
| | | | | 74/552 |
| 2013/0038033 A1* | 2/2013 | Baron | ............ | B62M 1/38 |
| | | | | 280/47.371 |
| 2018/0319367 A1* | 11/2018 | Ting | ............ | B60R 25/252 |
| 2021/0031863 A1* | 2/2021 | Jewell | ............ | B62K 21/04 |
| 2021/0107553 A1* | 4/2021 | Korte | ............ | B62D 1/04 |

* cited by examiner

TOOL-LESS STEERING WHEEL ASSEMBLY

CROSS-REFERENCE TO RELATED APPLICATION

This application claims the benefit of and priority to U.S. Provisional Application No. 62/713,253 filed Aug. 1, 2018, the disclosure of which is incorporated by reference herein in its entirety.

TECHNICAL FIELD

The invention relates generally to child ride-on vehicles, including motorized vehicles, trikes, quads, foot powered vehicles and the like, and more particularly to the assembly of a steering wheel to such a vehicle in a tool-less manner.

BACKGROUND

Motorized and other ride-on vehicles are among some of the most popular of today's outdoor toys for young children. Such ride-on vehicles are typically manufactured and shipped to various retail outlets in an unassembled state. Some retail outlets may offer a service of assembling the vehicle for the customer. However, in many instances, such a service may not be offered or the consumer chooses to forego the service and instead the consumer chooses to assemble the vehicle at home. In any event, conventional assembly of the vehicle typically requires the retail outlet or the consumer to have various tools for implementing assembly.

By way of example, in many instances, the steering wheel of the vehicle will have to be coupled to the vehicle during assembly. In this regard, vehicles typically have a steering rod extending from the body of the vehicle that is inserted within a corresponding sleeve of the steering wheel. The steering wheel and steering rod are configured to receive a bolt for securing the steering wheel to the steering rod, requiring tools such as a wrench or screwdriver for tightening. When assembly is performed at the retail outlet, such tool-based assembly can be costly and time consuming. Moreover, improper assembly by the retail outlet can be a source of consumer frustration and/or product return. When assembly is performed by the consumer in the home setting, for example, tool-based assembly can be the source of consumer frustration, and may likewise result in product return if the assembly process becomes too complex or daunting.

Thus, there remains a need for a steering wheel design which may be coupled to a steering rod in a tool-less manner and which is relatively simple in its design and cost effective in its manufacturing and implementation.

SUMMARY

A ride-on vehicle in accordance with aspects of the invention includes a steering wheel assembly for use with a ride-on vehicle having a frame with at least two wheels. The steering wheel assembly comprises a steering rod operatively coupled to the frame and a chuck secured to the steering rod, the chuck having a body extending between a base and an upper end. The steering wheel assembly further includes a steering wheel having a sleeve adapted to be coupled to the chuck in a tool-less manner. In this way, the steering wheel is configured to be engaged by a rider for moving the steering wheel and thereby steering the ride-on vehicle.

In one embodiment, the sleeve further includes a cavity configured to receive the chuck therein for achieving the tool-less assembly of the steering wheel to the chuck. Additionally, the sleeve may include at least one aperture for achieving the tool-less assembly of the steering wheel to the chuck. Furthermore, the chuck may include at least one spring clip assembly configured to engage the at least one aperture of the sleeve for achieving the tool-less assembly of the steering wheel to the chuck. The at least one spring clip may further comprise a leg member having a foot with a base portion. In this regard, the leg member may be formed on the upper end of the chuck and extend along the body of the chuck such that the leg member is substantially coplanar with the body of the chuck. Accordingly, the leg member is an extension of the upper end of the chuck.

In another embodiment, the chuck may include at least one pushbutton assembly slidably disposed in a recess formed in the body of the chuck. In this regard, the pushbutton assembly is configured to engage the at least one aperture of the sleeve for achieving the tool-less assembly of the steering wheel to the chuck. The at least one pushbutton assembly may further comprise a pushbutton and a coil spring. The coil spring and pushbutton may be disposed in the recess of the chuck with the coil spring being configured to bias the pushbutton outwardly from the recess. Furthermore, the recess formed in the chuck may include a shoulder and the pushbutton may include a flange. Accordingly, the shoulder is configured to be in a confronting relationship with the flange to limit the outward movement of the pushbutton from the recess.

In another embodiment, the base of the chuck may further include a rim configured to prevent the over-insertion of the chuck into the cavity of the sleeve. In yet another embodiment, the chuck may include a cylindrical recess configured to receive a portion of the steering rod therein for securing the chuck to the steering rod. Furthermore, the chuck and the steering rod may be coupled together using a nut and bolt combo. Additionally, the body of the chuck may include a channel configured to position a head of the bolt of the nut and bolt combo radially inwardly relative to the body of the chuck such that the head of the bolt is at least coplanar with the body of the chuck.

In another embodiment, the sleeve may include at least one key and the chuck may include at least one keyway such that the key and keyway cooperate to position the chuck and the sleeve in a preferred manner.

In yet another embodiment, a ride-on vehicle in accordance with aspects of the invention includes a frame having at least two wheels. The ride-on vehicle further comprises a steering rod operatively coupled to the frame and a chuck secured to the steering rod. The chuck includes an upper end and a base with two opposing flatted sides and two opposing curved sidewalls extending between the upper end and the base to define a body, the chuck having at least one keyway. The ride-on vehicle further comprises a steering wheel having a sleeve with a key located on an inner surface of the sleeve with the key being configured to cooperate with the keyway to position the chuck and sleeve in a preferred manner for tool-lessly coupling the sleeve of the steering wheel to the chuck. In this way, the steering wheel is configured to be engaged by a rider for moving the steering wheel and thereby steering the ride-on vehicle.

In another embodiment, the sleeve may further include a cavity configured to receive the chuck therein for achieving the tool-less assembly of the steering wheel to the chuck.

In another embodiment, the key may extend in an axial direction for the entire length of the inner surface of the sleeve. Additionally, the chuck may include two keyways. Furthermore, the inner surface of the sleeve may include a shoulder configured to prevent the over-insertion of the chuck into the cavity of the sleeve. In another embodiment, the chuck and the steering rod may be coupled together with a nut and bolt combo. In this way, the chuck may further include a groove configured to receive a portion of the nut and bolt combo therein.

A method of assembling a ride-on vehicle having a steering wheel assembly in a tool-less manner includes providing a ride-on vehicle having a frame with at least two wheels. The method further includes providing a steering wheel assembly having a steering rod with a chuck secured thereto, the chuck having at least one coupling mechanism and the steering rod being operatively coupled to the frame of the ride-on vehicle. Further providing a steering wheel having a sleeve with at least one aperture, the sleeve having a key located on an inner surface of the sleeve, the key being configured to cooperate with the keyway to position the chuck and sleeve in a preferred manner for tool-lessly coupling the sleeve of the steering wheel to the chuck. The first step of aligning the key of the sleeve with the keyway of the chuck. The next step of inserting a portion of the chuck into the sleeve of the steering wheel and moving the steering wheel in a direction to further slide the chuck into the sleeve until the sleeve nears the at least one coupling mechanism on the chuck. The next step of actuating the at least one coupling mechanism on the chuck and further inserting the chuck into the sleeve such that the sleeve slides over the coupling mechanism. The next step of further moving the steering wheel until the chuck is fully nested in the sleeve at which point the coupling mechanism of the chuck engages the aperture on the sleeve, thereby coupling the sleeve of the steering wheel to the chuck in a tool-less manner.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 5:
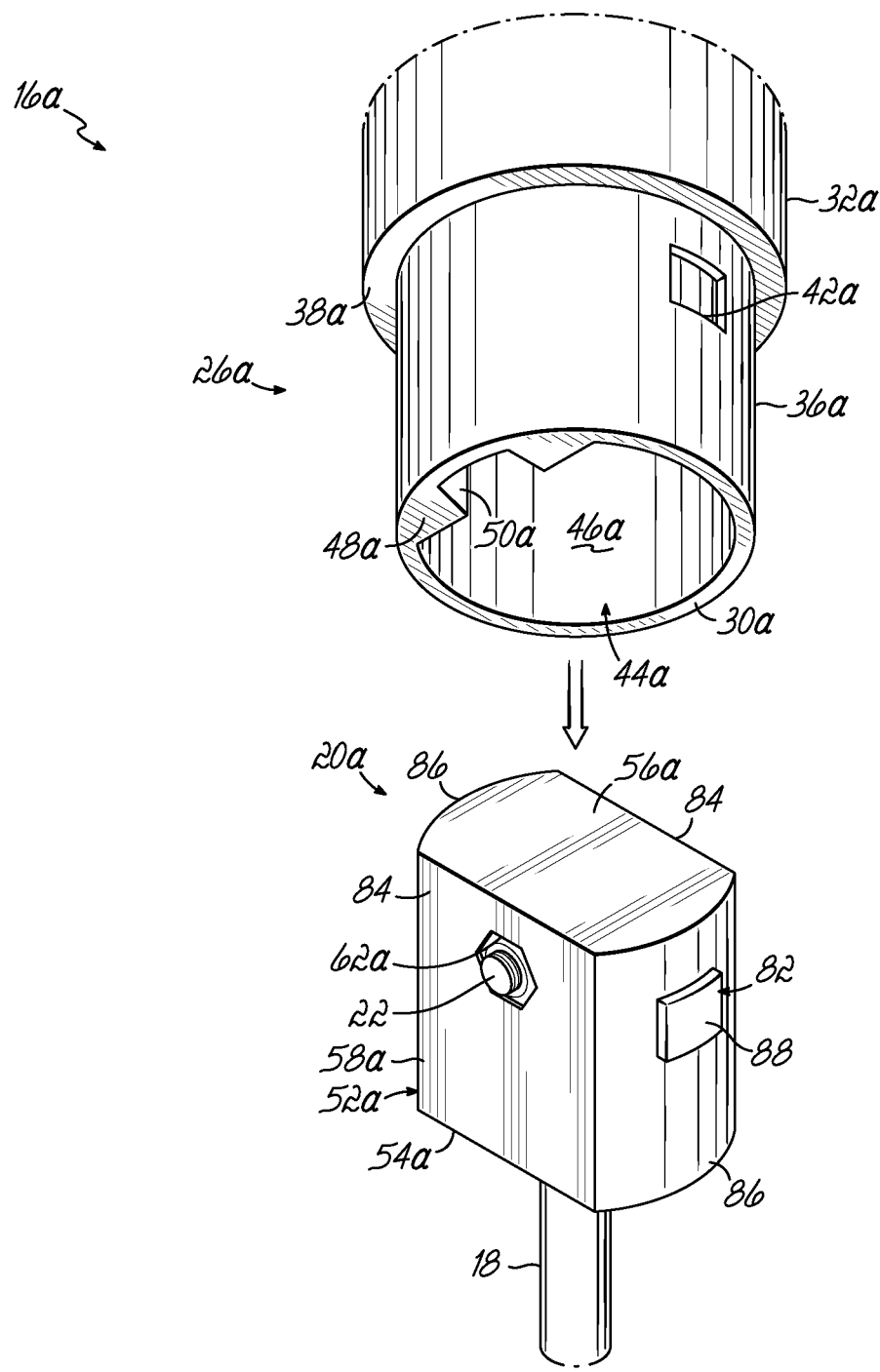
FIG. 5 is a disassembled perspective view of a steering wheel sleeve and chuck in one embodiment in accordance with aspects of the invention.
Figure 6:
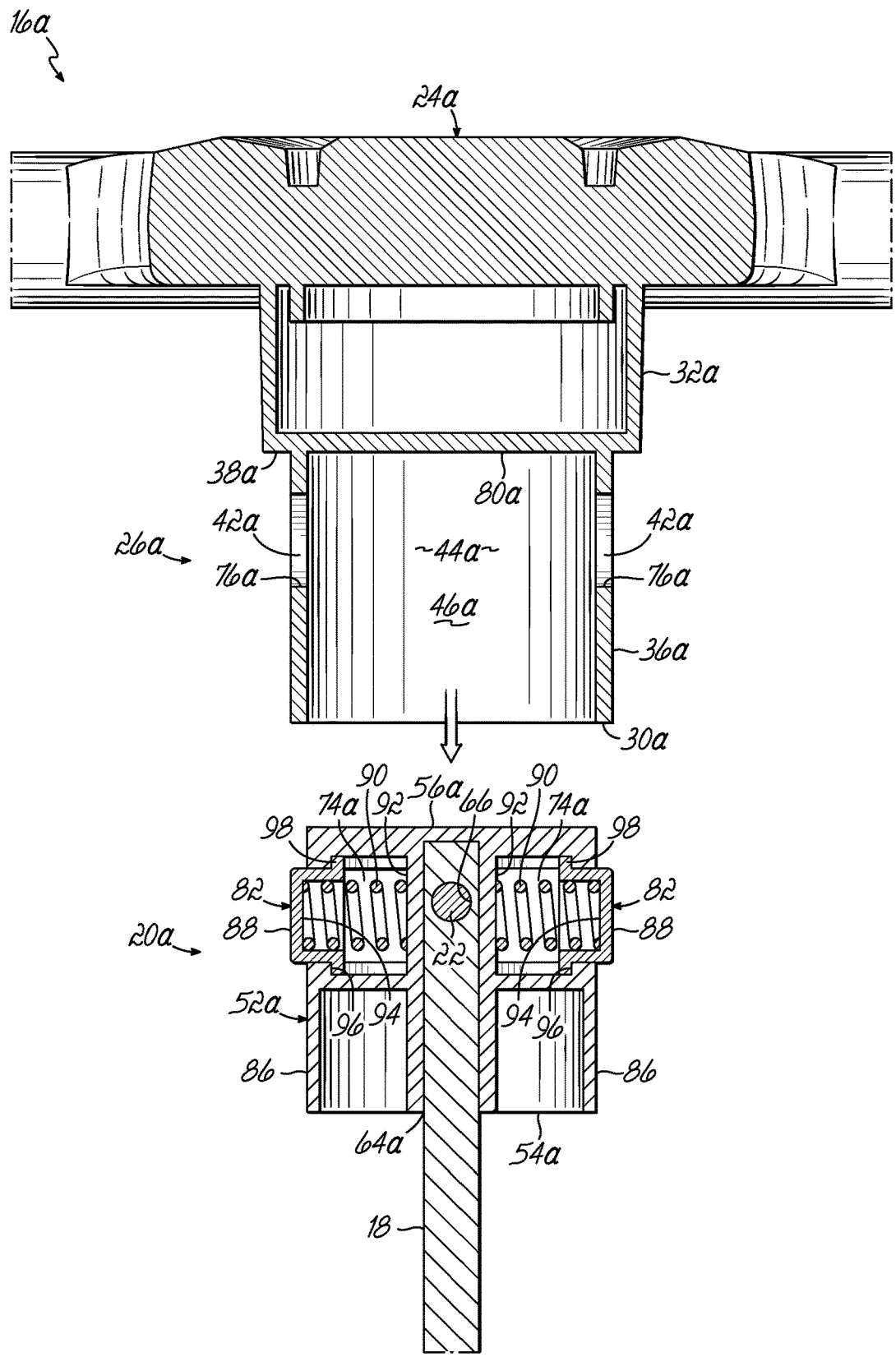
FIG. 6 is a cross-sectional view illustrating assembly of a steering wheel to a steering rod and chuck in a tool-less manner according to the embodiment shown in FIG. 5.
Figure 7:
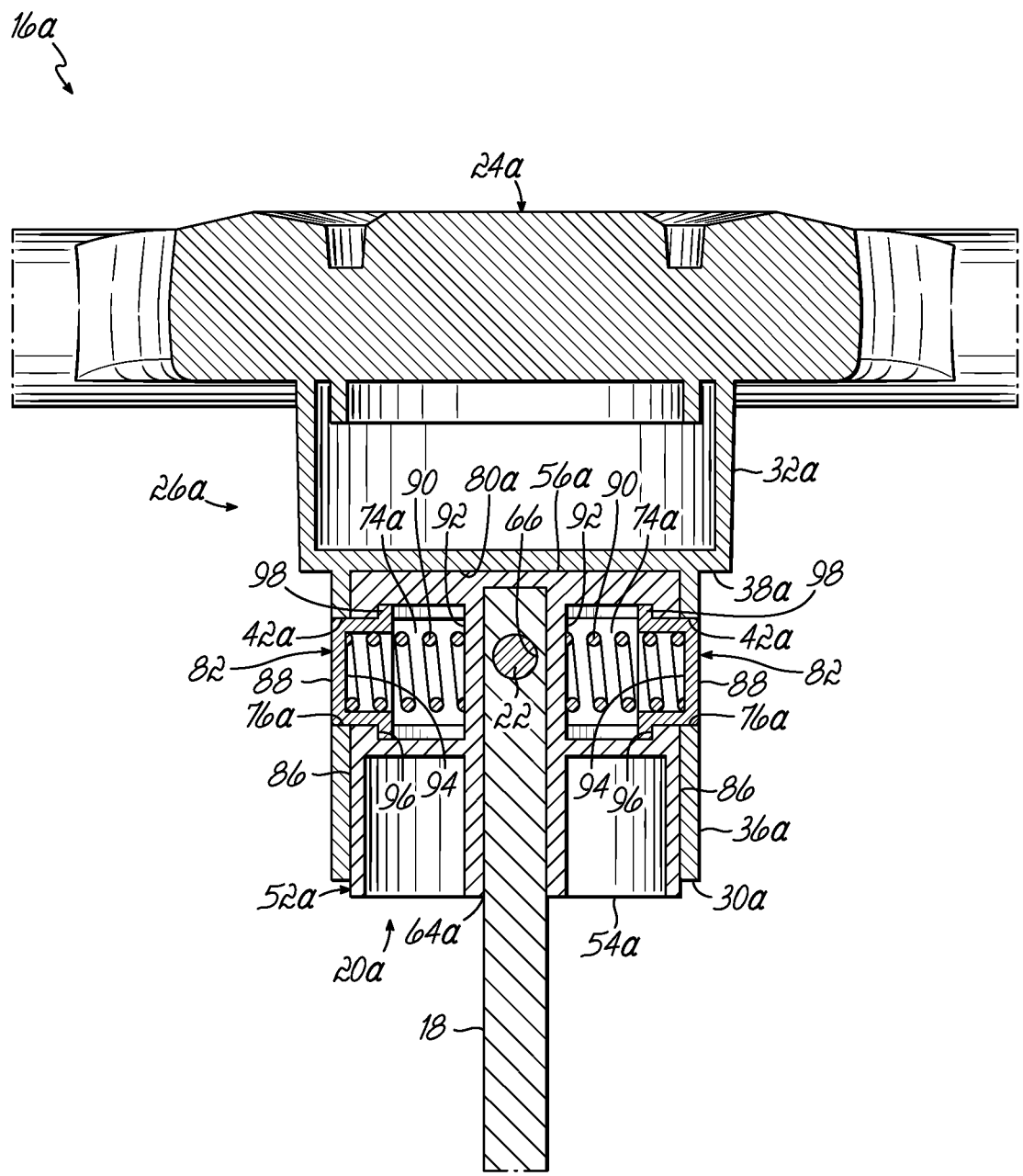
FIG. 7 is a cross-sectional view illustrating coupling of a steering wheel to a steering rod and chuck in a tool-less manner according to the embodiment shown in FIGS. 5 and 6.

Aspects of the present disclosure are directed to the tool-less assembly of a steering wheel to a child ride-on vehicle. As described above, these features may not come pre-assembled to the vehicle but require some amount of assembly by the retail outlet or the end consumer. In this regard, FIGS. 1-4 illustrate the elements and steps for achieving a tool-less assembly of a steering wheel to a child ride-on vehicle in accordance with an embodiment of the invention. FIGS. 5-7 then illustrate the elements and steps for achieving a tool-less assembly of a steering wheel to a child ride-on vehicle in accordance with another embodiment of the invention. While aspects of the present invention will be described herein in the context of a child ride-on vehicle, and more particularly a vehicle in the form of a car, it should be appreciated that other child vehicles, such as tricycles, scooters, or the like, having similar components may also benefit from aspects of the invention.

Figure 1:
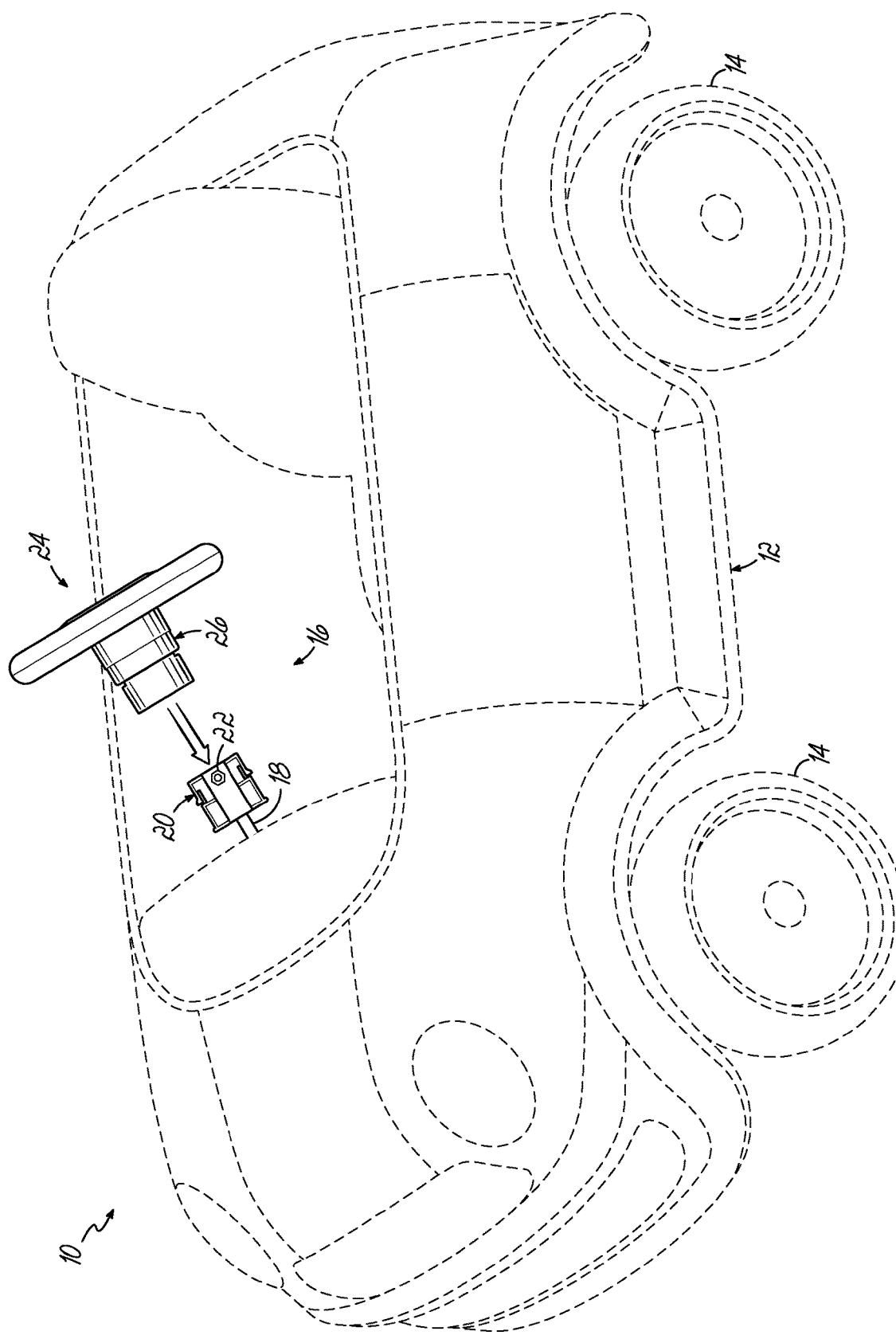
FIG. 1 is a side elevation view of a ride-on vehicle in the form of a car in one embodiment in accordance with aspects of the invention.

Referring now to the drawings and to FIG. 1 in particular, a ride-on vehicle 10 in the form of a car is shown. While the vehicle 10 is shown herein as a car, it should be recognized that the vehicle 10 may include most any ride-on vehicle, motorized or non-motorized, including trikes, quads, foot powered vehicles and the like. Accordingly, aspects of the invention are not limited to the specific embodiment shown and described herein, but encompass a wide range of ride-on vehicles. The vehicle 10 includes a frame 12, at least two wheels 14 (two shown, four in total), and a steering wheel assembly 16. The steering wheel assembly 16 allows a rider to direct or steer the vehicle 10 when in operation. The steering wheel assembly 16 includes a steering rod 18 with a chuck 20 fixed to the upper end of the steering rod 18 by a nut and bolt combo 22, and a steering wheel 24 having a sleeve 26 configured to couple to the chuck 20 in a tool-less manner. In this regard, the chuck 20 is configured to have at least one coupling mechanism configured to operatively engage the sleeve 26 of the steering wheel 24 for coupling the steering wheel 24 to the chuck 20, as explained in more detail below. Although the chuck 20 is shown coupled to the steering rod 18 by the nut and bolt combo 22, it will be appreciated that the chuck 20 may be coupled to the steering rod 18 by any other suitable means such as a screw, pin, or other like fasteners, for example. In another embodiment, the chuck 20 may be integrally formed with the steering rod 18 to form a unitary piece.

With continued reference to FIG. 1, the steering wheel 24 extends radially outwardly from the sleeve 26, with the sleeve 26 projecting from the steering wheel 24 so as to be generally perpendicular to the steering wheel 24. In this regard, the sleeve 26 is generally cylindrical in shape and configured to slidably receive the chuck 20 therein, as described in further detail below. In the embodiment shown, the steering wheel 24 and sleeve 26 are integrally formed as a unitary piece, however, the steering wheel 24 and sleeve 26 may be separately formed and fixedly coupled together through any suitable means such as a nut and bolt combo, screw, or the like fastener, for example. The steering wheel 24 is configured to receive, for example, the hands of the rider so as to rotate the steering wheel assembly 16 and steer the vehicle 10 when in operation. While the steering wheel 24 is shown as having a generally circular cross-sectional shape, it will be appreciated that the steering wheel 24 may have different configurations. For example, the cross-sectional shape of the steering wheel 24 may be oval, polygonal, or any other suitable shape.

Figure 2:
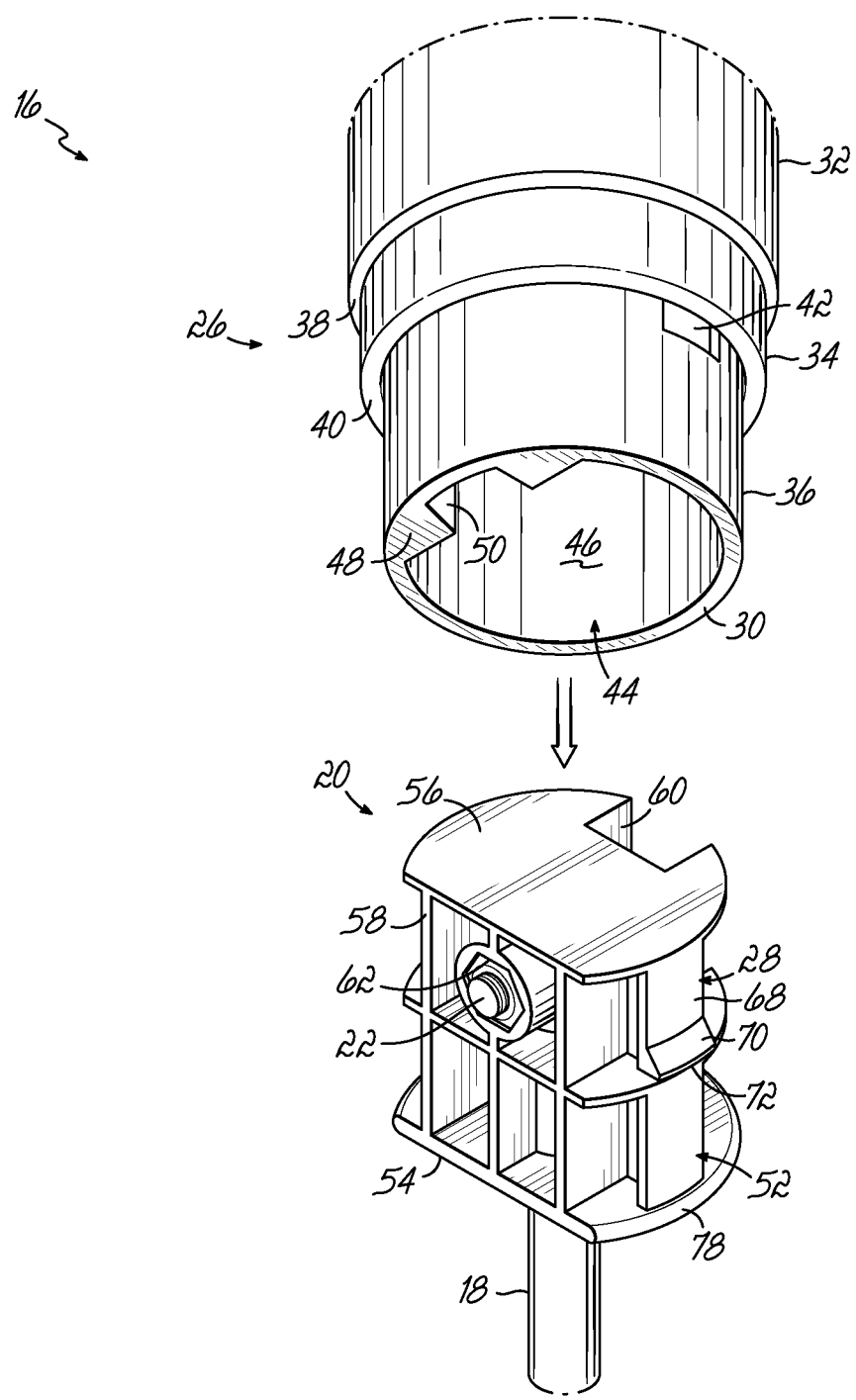
FIG. 2 is a disassembled perspective view of a steering wheel sleeve and chuck in one embodiment in accordance with aspects of the invention.
Figure 3:
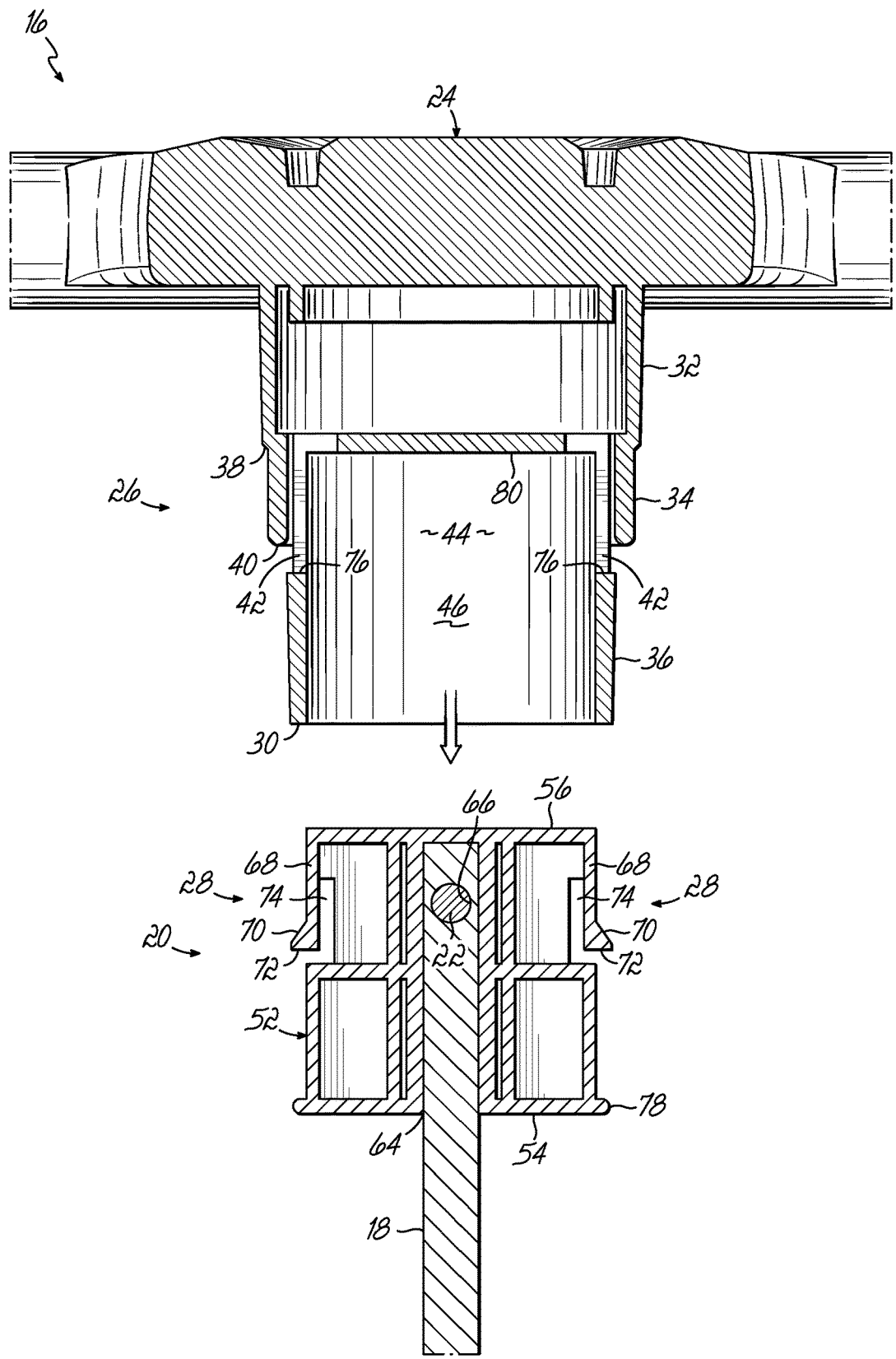
FIG. 3 is a cross-sectional view illustrating assembly of a steering wheel to a steering rod and chuck in a tool-less manner according to the embodiment shown in FIG. 2.
Figure 4:
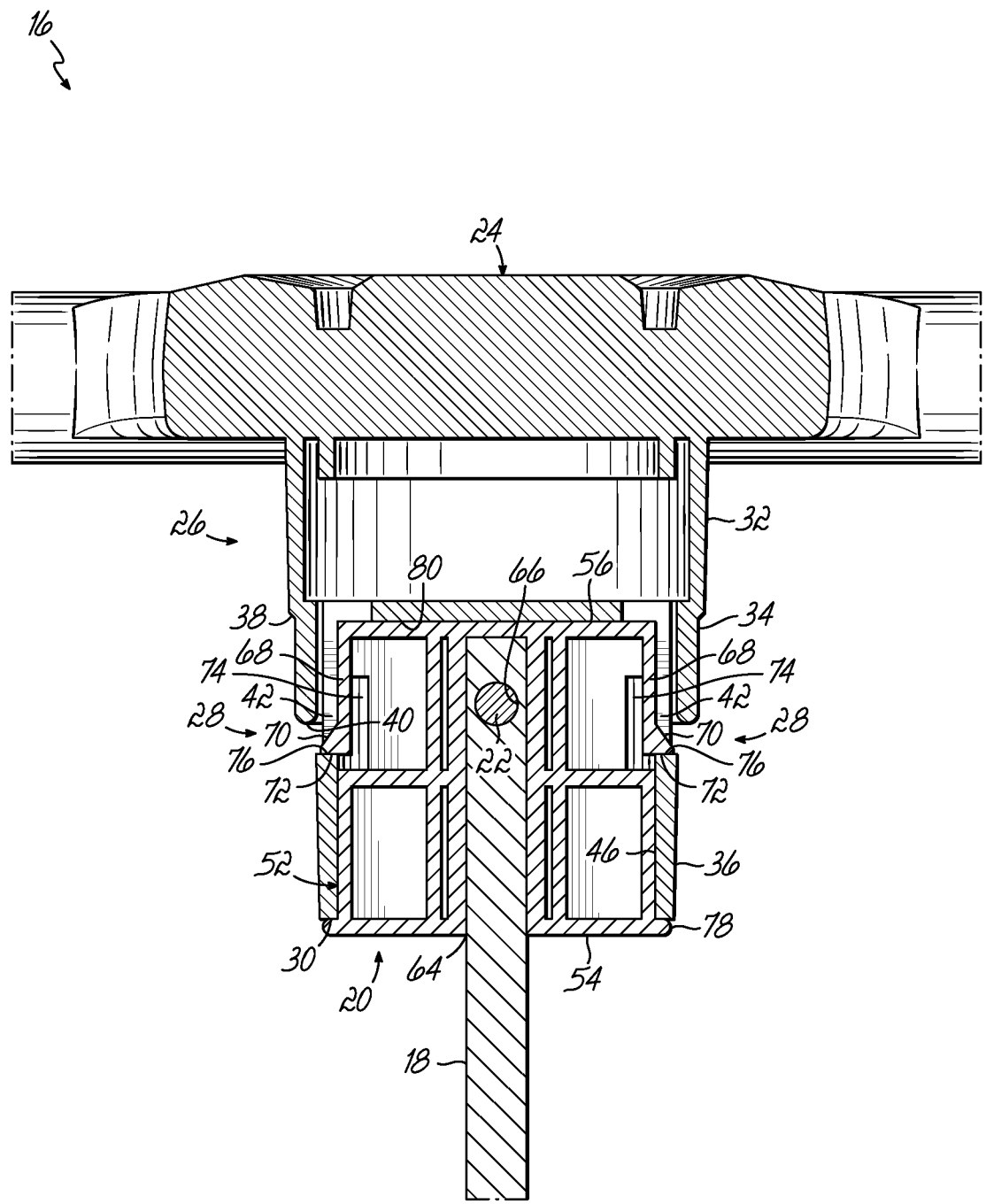
FIG. 4 is a cross-sectional view illustrating coupling of a steering wheel to a steering rod and chuck in a tool-less manner according to the embodiment shown in FIGS. 2 and 3.

Referring now to FIGS. 2-4, the steering wheel assembly 16 is shown according to one embodiment of the present invention. In the embodiment shown, the sleeve 26 is configured to slidably receive the chuck 20 therein for coupling the sleeve 26 of the steering wheel 24 to the chuck 20 and the steering rod 18 in a tool-less manner. In this regard, the chuck 20 includes at least one spring clip 28 for coupling the steering wheel 24 to the chuck 20 to achieve the tool-less assembly of the steering wheel assembly 16, as described in further detail below.

With continued reference to FIGS. 2-4, the sleeve 26 is generally tubular in shape and extends longitudinally from the steering wheel 24 to an open end 30. In this regard, the sleeve 26 has an enlarged upper portion 32, adjacent to the steering wheel 24, a semi-enlarged middle portion 34, and a lower portion 36 adjacent to the open end 30. As shown, the middle portion 34 is spaced radially inwardly relative to the upper portion 32 to define a first annular shoulder 38 therebetween. The lower portion 36 is spaced radially inwardly relative to the middle portion 34 to define a second annular shoulder 40 therebetween. The sleeve 26 further includes two generally rectangular apertures 42 formed in the lower portion 36 of the sleeve 26 and adjacent to the second annular shoulder 40. In this regard, the apertures 42 may be formed about 180 degrees apart around the circumference of the sleeve 26. However, the sleeve 26 may be configured to have more or less apertures 42 and the apertures 42 may be spaced more or less degrees apart around the circumference of the sleeve 26. As discussed in further detail below, the apertures 42 are configured to receive corresponding spring clips 28 therein for coupling the sleeve 26 of the steering wheel 24 to the chuck 20.

As best shown in FIG. 2, the sleeve 26 further includes a cavity 44 defined by a partially cylindrical inner surface 46 adjacent to the open end 30, the cavity 44 configured to slidably receive a portion of the chuck 20 therein. The inner surface 46 is sized to produce a frictional or interference fit with the chuck 20 for purposes engaging the spring clips 28 and securing the sleeve 26 of the steering wheel 24 to the chuck 20, as discussed in more detail below. The inner surface 46 further includes a key 48 defined by a flatted portion of the inner surface 46 that projects radially inwardly towards the center of the sleeve 26 so as to truncate the cylindrical shape of the inner surface 46 of the sleeve 26. The key 48 may extend in an axial direction for the entire length of the inner surface 46 of the sleeve 26. In another embodiment, the key 48 may extend less than the entire length of the inner surface 46 of the sleeve 26. As shown, the key 48 may be configured to have a generally "U" shaped groove 50 configured to accommodate the nut and bolt combo 22 that secures the chuck 20 to the steering rod 18. In this regard, the groove 50 may extend axially along the entire length of the key 48 and is sized to receive a portion of the nut and bolt combo 22 therein to facilitate coupling of the sleeve 26 of steering wheel 24 to the chuck 20.

As illustrated in FIGS. 2-4, the chuck 20 is generally cylindrical in shape and includes a body 52 extending between a base 54 and a generally flat upper end 56. As best shown in FIG. 2, the chuck 20 includes a keyway 58 formed in the chuck 20 and configured to cooperate with the key 48 of the inner surface 46 of the sleeve 26. As shown, the keyway 58 defines planar surface extending axially between the base 54 and the upper end 56 of the chuck 20 so as to truncate the cylindrical shape of the chuck 20. As discussed in further detail below, the key 48 cooperates with the keyway 58 to both align the sleeve 26 of the steering wheel 24 with the chuck 20 for coupling and minimize the forces experienced by the spring clips 28 during operation of the ride-on vehicle.

The chuck 20 further includes a generally "U" shaped channel 60 formed in the body 52 of the chuck 20 and diametrically opposed from the keyway 58. As shown, the channel 60 extends from the base 54 through the upper end 56 of the chuck 20 and is configured to facilitate access to the nut and bolt combo 22. In this regard, the body 52 of the chuck 20 includes a bore 62 extending between the channel 60 and the keyway 58. The bore 62 is configured to receive the nut and bolt combo 22 therethrough for coupling the chuck 20 to the steering rod 18. As shown, one end of the bore 62 may have a polygonal shape configured to receive the nut of the nut and bolt combo 22 therein. When the nut and bolt combo 22 is coupled to the chuck 20, the channel 60 is configured to position the head of the bolt of the nut and bolt combo 22 radially inwardly relative to the body 52 of the chuck such that the head of the bolt of the nut and bolt combo 22 is at least coplanar with the body 52 of the chuck 20. The recessed position of the bolt of the nut and bolt combo 22 facilitates coupling of the sleeve 26 of the steering wheel 24 to the chuck 20, as discussed in additional detail below.

As best shown in FIG. 3, the chuck 20 further includes a cylindrical recess 64 formed in the base 54 of the chuck 20, extending axially into the body 52 of the chuck 20 and configured to receive the steering rod 18 therein. In this regard, when the steering rod 18 is fully nested in the recess 64, a bore 66 in the steering rod 18 may be aligned with the bore 62 in the chuck 20 so that the bolt of the nut and bolt combo 22 may be disposed therethrough, coupling the chuck 20 to the steering rod 18. When coupled, the bolt of the nut and bolt combo 22 may be disposed within the channel 60 such that when the chuck 20 is positioned within the cavity 44 of the sleeve 26, the bolt of the nut and bolt combo 22 does not contact the inner surface 46 of the sleeve 26.

As discussed above, the tool-less connection may be made between the chuck 20 and the sleeve 26 of the steering wheel 24 utilizing a plurality (two shown) of spring clips 28 that engage corresponding apertures 42 on the sleeve 26 of the steering wheel 24. In this regard, each spring clip 28 is formed on a side of the body 52 of the chuck 20, between the keyway 58 and the channel 60. As shown, the location of the spring clips 28 relative to the keyway 58 of the chuck 20 generally correspond to the positioning of the apertures 42 formed in the sleeve 26 relative to the key 48. Accordingly, in the embodiment shown, the spring clips 28 are formed 180 degrees apart around the circumference of the chuck 20. However, the spring clips 28 may be positioned in any other suitable location about the chuck 20.

With reference to FIGS. 2-4, each spring clip 28 has a generally "L" shaped configuration comprising a leg member 68 having a foot 70 with a base portion 72. As illustrated, each spring clip 28 is formed adjacent to a peripheral edge of the upper end 56 of the chuck 20 and projects downwardly therefrom and along the body 52 of the chuck 20 such that each leg member 68 is a smooth, continuous extension of the upper end 56 of the chuck 20. In this regard, each leg member 68 is substantially perpendicular to the upper end 56 of the chuck 20 and substantially coplanar with the body 52 of the chuck 20. As shown, the chuck 20 further includes a recess 74 formed in the body 52 of the chuck 20 behind each leg member 68 to facilitate the inward flexing of the leg member 68. In this regard, each spring clip 28, and more particularly, each leg member 68 operates as a spring being capable of flexing inwardly, disposing the foot 70 of each spring clip 28 in the respective recess, yet resiliently biasing the foot 70 outwardly from the recess 74. To this end, each spring clip 28 may be formed from a suitable material, including various metals or plastics configured to withstand the loads imposed thereon. For example, the spring clip 28 may be formed from a suitable metal including, without limitation, hardened steel, tempered steel, or spring steel.

With continued reference to FIGS. 2-4, the tool-less coupling of the steering wheel 24 to the chuck 20 will now be described. In this regard, the steering wheel assembly 16 will typically be shipped to various retail outlets or directly to the consumer in a partially assembled state wherein the chuck 20 is secured to the steering rod 18 and the consumer need only couple the steering wheel 24 to the chuck 20 to fully assemble the steering wheel assembly 16 for use. As shown, the steering wheel 24 is coupled to the chuck 20 and steering rod 18 by inserting the chuck 20 into the sleeve 26 of the steering wheel 24. In this regard, the steering wheel 24 is positioned above the chuck 20 such that the key 48 of the sleeve 26 is aligned with the keyway 58 of the chuck 20, as seen in FIG. 2. When so aligned, a portion of the chuck 20 may be received within the cavity 44 of the sleeve 26 of the steering wheel 24. By continued downward movement of the steering wheel 24, the chuck 20 is further received within the cavity 44 of the sleeve 26 of the steering wheel 24. As the sleeve 26 traverses the body 52 of the chuck 20, the open end 30 nears the foot 70 of each spring clip 28. In this regard, the angled surface of each foot 70 facilitates the inward flexing of the leg member 68 inwardly towards the body 52 of the chuck 20 such that a portion of the foot 70 and leg member 68 of each spring clip 28 is disposed within the corresponding recess 74. When so positioned, the sleeve 26 may further traverse the chuck 20 to a fully seated position.

As best shown in FIG. 4, when the sleeve 26 of the steering wheel 24 nears its fully seated position relative to the chuck 20, each spring clip 28 on the chuck 20 engages the corresponding aperture 42 on the sleeve 26 of the steering wheel 24, coupling the steering wheel 24 and chuck 20. In this regard, when the chuck 20 nears its fully seated position relative to the sleeve 26, each spring clip 28, and more particularly the foot 70 of each spring clip 28, encounters the corresponding aperture 42 such that the leg member 68 snaps outwardly to position a portion of the foot 70 within the aperture 42. When so positioned, a portion of the base 72 of the foot 70 is adjacent to, and generally overlies a bearing surface 76 of each corresponding aperture 42 on the sleeve 26. The engagement between the base 72 of each foot 70 and the bearing surface 76 of the corresponding aperture 42 prevents the chuck 20 from pulling out of the sleeve 26 of the steering wheel 24. Thus, if the steering wheel 24 is pulled outwardly (i.e., away from chuck 20), the bearing surface 76 of the aperture 42 engages the base 72 of the foot 70 of each spring clip 28 so as to prevent or limit any substantial outward movement of the steering wheel 24. Accordingly, the steering wheel 24 is secured to the chuck 20 in a tool-less manner. When coupled, as shown in FIG. 4, the enlarged upper portion 32 and middle portion 34 of the sleeve 26 may be configured to protect the exposed foot of the spring clip 28 from being accidentally or otherwise unintentionally disengaged.

As shown in FIGS. 2-4, the base 54 of the chuck 20 may further define a rim 78 that extends outwardly from the body 52 of the chuck 20. In this regard, the rim 78 may function as a stop for the open end 30 of the sleeve 26 of the steering wheel 24, preventing over-insertion of the chuck 20 into the cavity 44 of the sleeve 26. Similarly, the inner surface 46 of the sleeve 26 may also include a shoulder 80 that projects radially inwardly towards the center of the sleeve 26. The shoulder 80 may be configured to function as a stop for the upper end 56 of the chuck 20, preventing over-insertion of the chuck 20 into the sleeve 26. In this embodiment, the sleeve 26 may be sized such that when the open end 30 of the sleeve 26 is adjacent to, or abuts the rim 78, and the upper end 56 of the chuck 20 is adjacent to, or abuts the shoulder 80 of the sleeve 26, the spring clips 28 engage the corresponding apertures 42.

When the sleeve 26 of the steering wheel 24 is coupled to the chuck 20, as shown in FIG. 4 and described above, the key 48 of the sleeve 26 is in a confronting relationship with the keyway 58 of the chuck 20. In this regard, radial movement of the steering wheel 24 and sleeve 26 about the chuck 20 and steering rod 18 causes the key 48 to engage the keyway 58, facilitating the transfer of radial movement to the chuck 20 and steering rod 18. As a result of this engagement, the loads experienced by the spring clips 28 and, more specifically the foot 70 of each spring clip 28, may be minimized during operation of the child ride-on vehicle. In this regard, the keyway 58 may be a flat surface formed on the body 52 of the chuck 20 such that the dimensions of the keyway 58 is congruent with the dimensions of the key 48 on the sleeve 26. The keyway 58 is configured to produce a frictional or interference fit with the key 48 when the chuck 20 is inserted into the sleeve 26. This prevents the steering wheel 24 and sleeve 26 from moving independently of the chuck 20, and aligns the chuck 20 and sleeve 26 in a preferred manner. However, those of ordinary skill in the art will recognize that the invention is not so limited as other key 48 and keyway 58 shapes and configurations are possible.

Furthermore, when the key 48 on the sleeve 26 engages the keyway 58 on the chuck 20, the coupling mechanism(s) on the chuck 20 are aligned with the corresponding apertures 42 on the sleeve 26. This prevents any misalignment issues when coupling the steering wheel 24 to the chuck 20 during assembly. Moreover, in the coupled position, the key 48 greatly reduces the loads (e.g., stress) that may be imposed on the coupling mechanism(s) during use of the steering wheel 24. Consequently, the coupling mechanism(s) may remain more reliable during the useful life of the steering wheel assembly 16.

Referring now to FIGS. 5-7, in which like reference numerals refer to like features in FIGS. 1-4, a steering wheel assembly 16a in accordance with an alternative embodiment is shown. In the embodiment shown, the steering wheel assembly 16a may be similar to the steering wheel assembly 16 of FIGS. 1-4 in many respects, but differ in the configuration of the sleeve 26 and the chuck 20. Accordingly, the steering wheel assembly 16a includes a steering rod 18 with a chuck 20a fixed to the upper end of the steering rod 18 by a nut and bolt combo 22, and a steering wheel 24a having a sleeve 26a configured to couple to the chuck 20a in a tool-less manner. This embodiment is functionally similar to the first embodiment shown in FIGS. 1-4. In this embodiment, however, the chuck 20a includes at least one push-button assembly 82 (two shown) for the tool-less coupling of the sleeve 26a of the steering wheel 24a to the chuck 20a and steering rod 18, as described in further detail below.

With continued reference to FIGS. 5-7, the sleeve 26a is generally tubular in shape and extends longitudinally from the steering wheel 24a to an open end 30a. As shown, the sleeve 26a includes an enlarged upper portion 32a adjacent to the steering wheel 24a, and a lower portion 36a adjacent to the open end 30a, the lower portion 36a being spaced radially inwardly relative to the enlarged upper portion 32a wherein the enlarged upper portion 32a and lower portion 36a are separated by an annular shoulder 38a. The sleeve 26a further includes two generally rectangular apertures 42a formed in the lower portion 36a of the sleeve 26a and near the annular shoulder 38a. As shown, the apertures 42a may be formed about 180 degrees apart around the circumference of the sleeve 26a. However, the sleeve 26a may be configured to have more or less apertures 42a and the apertures 42a may be spaced more or less degrees apart around the circumference of the sleeve 26a. As discussed in further detail below, the apertures 42a are configured to receive a portion of the corresponding pushbutton assembly 82 therein for coupling the sleeve 26a of the steering wheel 24a to the chuck 20a.

As best illustrated in FIG. 5, and similar to the embodiment shown in FIGS. 1-4, the sleeve 26a further includes a cavity 44a defined by a partially cylindrical inner surface 46a adjacent to the open end 30a, the cavity 44a configured to slidably receive the chuck 20a therein. The inner surface 46a of the sleeve 26a further includes a key 48a having a generally "U" shaped groove 50a configured to accommodate the nut and bolt combo 22 that secures the chuck 20a to the steering rod 18. In this regard, various other features of the sleeve 26a are generally similar to those described above with respect to FIGS. 1-4 and are not repeated here for the sake of brevity.

As shown in FIGS. 5-7, the chuck 20a includes an upper end 56a and a base 54a with two opposing flatted sides 84 and two opposing curved sidewalls 86 extending between the upper end 56a and the base 54a to define a body 52a of the chuck 20a. In this regard, either one of the flatted sides 84 may function as a keyway 58a configured to cooperate with the key 48a of the inner surface 46a of the sleeve 26a, as described in further detail below. The chuck 20a further includes a bore 62a extending between the flatted sides 84 and configured to receive the nut and bolt combo 22 therethrough for coupling the chuck 20a to the steering rod 18. As shown, one end of the bore 62a may have a polygonal shape configured to receive the nut of the nut and bolt combo 22 therein. As best shown in FIG. 6, the chuck 20a further includes a cylindrical recess 64a formed in the base 54a of the chuck 20a, extending axially into the body 52a of the chuck 20a and configured to receive the steering rod 18 therein. In this regard, when the steering rod 18 is fully nested in the recess 64a, the chuck 20a may be coupled to the steering rod 18 via the nut and bolt combo 22. Furthermore, when the chuck 20a is coupled to the steering rod 18 via the nut and bolt combo 22, the flatted sides 84 of the chuck 20a are configured to space the nut and bolt combo 22 away from the inner surface 46a of the sleeve 26a when the chuck 20a is positioned within the cavity 44a of the sleeve 26a.

As discussed above, the tool-less connection may be made between the chuck 20a and the sleeve 26a of the steering wheel 24a utilizing a plurality (two shown) of pushbutton assemblies 82 configured to engage corresponding apertures 42a on the sleeve 26a of the steering wheel 24a. With reference to FIGS. 5-7, one pushbutton assembly 82 is shown located on one sidewall 86 of the chuck 20a and another pushbutton assembly 82 is located on the other sidewall 86 of the chuck 20a such that the pushbutton assemblies 82 are diametrically opposed. Each pushbutton assembly 82 includes a pushbutton 88 and a coil spring 90. As shown, the pushbutton 88 and coil spring 90 are disposed within a recess 74a formed in the corresponding sidewall 86 of the chuck 20a. In this regard, the pushbutton 88 is configured such that a portion of the pushbutton 88 extends from the recess 74a in the chuck 20a to be accessible by the consumer, as discussed in further detail below. Although the pushbutton 88 is shown as being generally rectangular in shape, any other suitable shape may be used. Furthermore, the pushbutton assembly 82 is not limited to the use of a coil spring 90, and it is understood that any other device capable of providing bias for the pushbutton 88 may be used such as a spring clip, for example. The pushbutton 88 may be formed from a suitable material, including various metals or plastics configured to withstand the loads imposed thereon. For example, the pushbutton 88 may be formed from a suitable metal including, without limitation, hardened steel, or tempered steel. Other materials may also be possible.

With reference to FIGS. 6-7, each recess 74a is configured to slidably receive and retain the pushbutton 88 such that the pushbutton 88 may be depressed into the recess 74a, yet be biased outwardly from the recess 74a by the coil spring 90. In this regard, the coil spring 90 may be disposed within the recess 74a such that one end of the coil spring 90 engages a base surface 92 of the recess 74a and the opposite end of the coil spring 90 is disposed within a pocket 94 formed by the pushbutton 88 so as to engage the pushbutton 88. As a result of this engagement, the coil spring 90 applies force in an outward direction, away from the base 92 of the recess 74a, biasing the pushbutton 88 out from the recess 74a. To prevent the pushbutton 88 from moving too far in an outward direction from the recess 74a, each recess 74a includes a shoulder 96 and each pushbutton 88 includes a flange 98 configured to be in a confrontational engagement with the shoulder 96 of the recess 74a. The flange 98 may extend around the entire periphery of the pushbutton 88. In another embodiment, the flange 98 may be configured to extend for less than the entire periphery of the pushbutton 88, such as, for example, the flange 98 may only be located on two sides of the pushbutton 88. The confrontational engagement between the flange 98 of the pushbutton 88 and the shoulder 96 of the recess 74a acts as a retainer to control the degree of travel of the pushbutton 88 within the recess 74a. To this end, the pushbutton 88 can be depressed into the recess 74a, compressing the coil spring 90 such that the pushbutton 88 will spring outwardly from the recess 74a when pressure against the pushbutton 88 is relieved. Thus, the shoulder 96 allows the pushbutton 88 to be depressed, but limits the outward movement of the pushbutton 88 by the coil spring 90. As shown, when the flange 98 of the pushbutton 88 abuts the shoulder 96 of the recess 74a, a portion of the pushbutton 88 extends beyond a plane defined by the sidewall 86 of the chuck 20a and is exposed for access by the consumer, as described in further detail below.

With reference to FIGS. 6-7, the tool-less coupling of the sleeve 26a of the steering wheel 24a to the chuck 20a will now be described in connection with FIG. 5. Similar to the embodiment shown in FIGS. 1-4, the steering wheel 24a is coupled to the chuck 20a and steering rod 18 by inserting the chuck 20a into the sleeve 26a of the steering wheel 24a. In this regard, the steering wheel 24a is positioned above the chuck 20a so as to align the key 48a of the sleeve 26a with the keyway 58a of the chuck 20a, as shown in FIG. 5. However, either of the flatted sides 84 of the chuck 20a can function as the keyway 58a. When so aligned, the chuck 20a may be received within the cavity 44a of the sleeve 26a of the steering wheel 24a whereby continued downward movement of the steering wheel 24a further disposes the chuck 20a within the cavity 44a of the sleeve 26a. As the sleeve 26a traverses the body 52a of the chuck 20a, the open end 30a nears the exposed pushbutton 88 of each pushbutton assembly 82. When so positioned, each pushbutton 88 may be depressed, partially disposing each pushbutton 88 within the corresponding recess 74a such that each pushbutton 88 is at least coplanar with the sidewall 86 of the chuck 20a. Once each pushbutton 88 has been depressed, the sleeve 26a of the steering wheel 24a may slide over each pushbutton 88 and further receive the chuck 20a within the cavity 44a of the sleeve 26a. Accordingly, the sleeve 26a may further traverse the chuck 20a to a fully seated position.

As best shown in FIG. 7, when the sleeve 26a of the steering wheel 24a nears its fully seated position relative to the chuck 20a, each pushbutton 88 engages the corresponding aperture 42a on the sleeve 26a of the steering wheel 24a, coupling the steering wheel 24a and chuck 20a. In this regard, when the chuck 20a nears its fully seated position relative to the sleeve 26a, each pushbutton 88 encounters the corresponding aperture 42a such that the pushbutton 88 pops outwardly to position a portion of the pushbutton 88 within the aperture 42a of the sleeve 26a. In this regard, each aperture 42a is sized only slightly greater than the dimensions of each pushbutton 88 such that the pushbutton 88 may be snugly received within each aperture 42a by virtue of bias provided by the coil spring 90. When each pushbutton 88 is disposed within the corresponding aperture 42a, the steering wheel 24a is secured to the chuck 20a in a tool-less manner. As such, if the steering wheel 24a is pulled outwardly (i.e., away from chuck 20a), a bearing surface 76a of each aperture 42a engages each pushbutton 88 so as to prevent or limit any substantial outward movement of the steering wheel 24a.

As illustrated in FIGS. 6-7, the inner surface 46a of the sleeve 26a may also include a shoulder 80a that projects radially inwardly towards the center of the sleeve 26a. The shoulder 80a may be configured to function as a stop for the upper end 56a of the chuck 20a, preventing over-insertion of the chuck 20a into the cavity 44a of the sleeve 26a. In this regard, the shoulder 80a may be configured to provide a closed end to the sleeve 26a. In another embodiment, the shoulder 80a may only project partially radially inwardly from the inner surface 46a towards the center of the sleeve 26a. Accordingly, the shoulder 80a may be a continuous projection or, alternatively, a plurality of discrete projections.

As shown in FIG. 7, when the steering wheel 24a is coupled to the chuck 20a, the pushbutton 88 is substantially coplanar with the lower portion 36a of the sleeve 26a. However, in another embodiment, the pushbutton 88 may extend outwardly beyond a plane defined by the lower portion 36a of the sleeve 26a. Additionally, the enlarged upper portion 32a of the sleeve 26a may be configured to protect the exposed portion of the pushbutton 88 from being accidentally or otherwise unintentionally disengaged.

In accordance with aspects of the invention, the coupling of the sleeve 26, 26a of the steering wheel 24, 24a to the chuck 20, 20a is achieved in a tool-less manner. In this regard, the amount of force that it takes to push the steering wheel 24, 24a onto the chuck 20, 20a is configured to be within the capacity of an adult person using his or her hands. Based on the above descriptions, it should be appreciated that the coupling of the sleeve 26, 26a of the steering wheel 24, 24a to the chuck 20, 20a is therefore quick, relatively easy to understand and implement, and achieved without the need of any tools. Additionally, the mechanism(s) that provide for the tool-less assembly are relatively simple in their design and cost-effective in regard to manufacturing and implementation.

While the present invention has been illustrated by a description of various preferred embodiments and while these embodiments have been described in some detail, it is not the intention of the inventor to restrict or in any way limit the scope of the appended claims to such detail. Additional advantages and modifications will readily appear to those skilled in the art. Thus, the various features of the invention may be used alone or in any combination depending on the needs and preferences of the user.

What is claimed is:
1. A ride-on vehicle, comprising:
 a frame having at least two wheels;
 a steering rod operatively coupled to the frame;
 a chuck secured to the steering rod, the chuck having a body extending between a base and an upper end; and
 a steering wheel having a sleeve adapted to be coupled to the chuck in a tool-less manner, the sleeve having a cavity defined by an inner surface configured to receive the chuck therein, the sleeve having a key located on the inner surface;
 wherein the steering wheel is configured to be engaged by a rider for moving the steering wheel and thereby steering the ride-on vehicle,
 wherein the sleeve includes at least one aperture for achieving a tool-less assembly of the steering wheel to the chuck,
 wherein the chuck includes at least one spring clip assembly configured to engage the at least one aperture of the sleeve for achieving the tool-less assembly of the steering wheel to the chuck, and
 wherein the at least one spring clip assembly comprises a leg member having a foot with a base portion, the leg member being formed on the upper end of the chuck and extending along the body of the chuck and being substantially coplanar with the body of the chuck such that the leg member is an extension of the upper end of the chuck.

2. The ride-on vehicle of claim 1, wherein the chuck includes at least one pushbutton assembly slidably disposed in a recess formed in the body of the chuck, the at least one pushbutton assembly being configured to engage the at least one aperture of the sleeve for achieving the tool-less assembly of the steering wheel to the chuck.

3. The ride-on vehicle of claim 2, wherein the at least one pushbutton assembly further comprises a pushbutton and a coil spring, the coil spring and the pushbutton being disposed in the recess of the chuck and the coil spring being configured to bias the pushbutton outwardly from the recess.

4. The ride-on vehicle of claim 3, wherein the recess formed in the chuck includes a shoulder and the pushbutton includes a flange, the shoulder configured to be in a confronting relationship with the flange to limit an outward movement of the pushbutton from the recess.

5. The ride-on vehicle of claim 1, wherein the base of the chuck includes a rim configured to prevent an over-insertion of the chuck into the cavity of the sleeve.

6. The ride-on vehicle of claim 1, wherein the chuck includes a cylindrical recess configured to receive a portion of the steering rod therein for securing the chuck to the steering rod.

7. The ride-on vehicle of claim 6, wherein the chuck and the steering rod are coupled together with a nut and bolt combo.

8. The ride-on vehicle of claim 7, wherein the body of the chuck includes a channel configured to position a head of the bolt of the nut and bolt combo radially inwardly relative to the body of the chuck such that the head of the bolt is at least coplanar with the body of the chuck.

9. The ride-on vehicle of claim 1, wherein the key is defined by a flatted portion of the inner surface that projects radially inward towards a center of the sleeve and the chuck includes at least one keyway, the key and the at least one keyway cooperating to align the chuck with the sleeve.

10. A method of assembling a ride-on vehicle having a steering wheel assembly in a tool-less manner, the method comprising:
    providing the ride-on vehicle having a frame with at least two wheels;
    providing the steering wheel assembly having a steering rod with a chuck secured thereto, the chuck having a body extending between a base and an upper end, the chuck having at least one spring clip assembly including a leg member having a foot with a base portion, the leg member being formed on the upper end of the chuck and extending along the body of the chuck and being substantially coplanar with the body of the chuck such that the leg member is an extension of the upper end of the chuck, and the steering rod being operatively coupled to the frame of the ride-on vehicle, and a steering wheel having a sleeve with at least one aperture, the sleeve having a cavity defined by an inner surface, the sleeve having a key located on the inner surface of the sleeve;
    aligning the key of the sleeve with a keyway of the chuck;
    inserting a portion of the chuck into the sleeve of the steering wheel and moving the steering wheel in a direction to further slide the chuck into the sleeve until the sleeve nears the at least one spring clip assembly on the chuck;
    actuating the at least one spring clip assembly on the chuck and further inserting the chuck into the sleeve such that the sleeve slides over the at least one spring clip assembly; and
    further moving the steering wheel until the chuck is fully nested in the sleeve at which point the at least one spring clip assembly of the chuck engages the at least one aperture on the sleeve, thereby coupling the sleeve of the steering wheel to the chuck in the tool-less manner.

11. The method of assembling of claim 10, wherein the key is defined by a flatted portion of the inner surface that projects radially inward towards a center of the sleeve, the key and the keyway cooperating to align the chuck with the sleeve.

* * * * *